United States Patent

Prochnow et al.

[11] 4,221,477
[45] Sep. 9, 1980

[54] CAMERA

[75] Inventors: Claus Prochnow; Günter Adamski, both of Brunswick, Fed. Rep. of Germany

[73] Assignee: Rollei-Werke Franke & Heidecke GmbH & Co. Kg, Brunswick, Fed. Rep. of Germany

[21] Appl. No.: 50,111

[22] Filed: Jun. 19, 1979

[30] Foreign Application Priority Data

Jun. 30, 1978 [DE] Fed. Rep. of Germany ....... 2828778

[51] Int. Cl.² ...................... G03B 17/56; G03B 29/00
[52] U.S. Cl. ...................................... 354/82; 354/266
[58] Field of Search .................. 354/81, 82, 266, 269, 354/293; 352/243

[56] References Cited

U.S. PATENT DOCUMENTS

| 3,043,205 | 7/1962 | Kaminski | 352/243 |
| 3,186,319 | 6/1965 | Hochstein | 354/266 |
| 3,240,143 | 3/1966 | Koeber et al. | 354/82 |
| 4,097,883 | 6/1978 | Adamski et al. | 354/293 |

Primary Examiner—John Gonzales
Attorney, Agent, or Firm—Michael J. Striker

[57] ABSTRACT

A camera has a housing accommodating a shutter release element, and a detachable handgrip on the housing which is turnable about a pivot axis extending transverse to the optical axis. A trigger element is integrated in the handgrip and a coupling is provided which, on depressing of the trigger element, will operate the shutter release element irrespective of the position which the handgrip assumes relative to the camera housing on being turned about the aforementioned pivot axis.

20 Claims, 6 Drawing Figures

CAMERA

BACKGROUND OF THE INVENTION

The present invention relates to a photographic camera, particularly—but not exclusively—to a still camera.

More particularly, the invention relates to a photographic camera having a handgrip connected with the housing of the camera, preferably in releasable (i.e. detachable) relationship.

Cameras with detachable handgrips are already known in the art. The purpose of these handgrips is to facilitate the operation of the camera by making the handgrip turnable about an axis which extends transverse (usually normal) to the optical axis of the camera lens. This makes it possible for the camera to be more conveniently operated while being held in either the left hand or the right hand of a user, and also has other advantages in terms of camera operation. In order to permit one-hand operation, i.e. to free the second hand of the user completely for various settings to be performed on the camera, such as the distance setting and the exposure parameters, it is advantageous if the handle is provided with a manually operable trigger which controls the shutter release of the camera, so that one hand not only holds the camera via the handle but also operates the camera mechanism.

In a known camera of this type the handgrip is mounted laterally on the camera housing and provided with a substantially axially extending bore through which a Bowden-type wire release (commercially available) can be pulled so that the pushbutton of the release projects beyond the free end of the handgrip and can be depressed by the thumb or index finger of the user. The cable part of the wire release projects from the handgrip and its free end carries a threaded nipple which must be screwed into the wire-release connector of the camera. This arrangement has the advantage that it permits the handgrip and camera to be freely turned with reference to one another to different positions, and nevertheless assures that irrespective of the particular position the camera can always be operated by use of the wire release. However, it is a pronounced disadvantage that the installation and removal of the handgrip are very time consuming. It is first necessary, when installing the handgrip, to insert the wire release into the grip, thereupon to connect the grip with the camera housing, and finally to screw the nipple of the wire release into the appropriate connector of the housing. Also, the cable of the wire release hangs freely between the handgrip and the camera and a user may become entangled in it.

SUMMARY OF THE INVENTION

Accordingly, it is an object of the present invention to provide an improved camera which is not possessed of the disadvantages of the prior art.

More particularly, it is an object of the invention to provide such an improved camera, particularly—but not exclusively—a still camera, wherein it is assured that when the handgrip is connected to or removed from the camera housing, the shutter release element and the trigger element are automatically disengaged, respectively re-engaged with one another. Thus, a simple mounting of the handgrip on the housing automatically assures that the camera is ready for operation without requiring any further measures.

Pursuant to the above objects, and others which will become apparent hereafter, one aspect of the invention resides in a camera, particularly a still camera, which briefly stated may comprise a housing mounting a lens having an optical axis, a shutter release element in the housing, a handgrip on the housing and being at least in part turnable about a pivot axis extending transverse to the optical axis, and a trigger element integrated in the handgrip. Further, the camera may comprise coupling means connecting the trigger element with the shutter release element and being operative for actuating the shutter release element in response to operation of the trigger element. More specifically, the coupling means may comprise a first coupling member connected to one of the elements and having an arcuate engaging surface, and a second coupling member connected to the other of the elements and in sliding contact with the engaging surface, so that motion-transmitting engagement between the members is maintained despite turning of the handgrip about the aforementioned pivot axis.

The above construction assures a compact and inexpensive handgrip arrangement in which the mere assembling of the handgrip to the camera housing automatically makes the shutter release element ready for use. Despite the integration of the trigger element, usually a button, in the camera handgrip the free ability of the handgrip to be pivoted relative to the housing is completely maintained and the shutter release element can be operated by the trigger element in any relative position of housing and handgrip. Moreover, the integration of the trigger button in the handgrip as a non-disconnectable part of the same makes it possible to locate the trigger button on the handgrip in any position found to be most suitable for convenient operation by the user and to be least tiring to the user. This greatly contributes to the ability of the user to hold the camera steady over long periods of time. Moreover, the complete integration of the trigger button in the handgrip eliminates all previously necessary Bowden cables or other cables which might cause problems.

According to a currently preferred embodiment of the invention the handgrip is mounted on the bottom wall of the camera housing, to be turnable about a pivot axis extending substantially normal to the plane of the bottom wall. This makes it possible to adjust the camera to be held either in the left hand or in the right hand of the user, simply by appropriate pivoting of the handle relative to the camera housing and without requiring any other additional measures. This makes it possible for the camera to be handled with equal ease and facility by persons who are left handed or right handed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Referring now to the drawing in detail, and firstly discussing the embodiment illustrated in FIGS. 1–3, it will be seen that this embodiment is being described with reference to a still camera. However, it should be understood that the invention is equally applicable to motion picture cameras.

Figure 1:
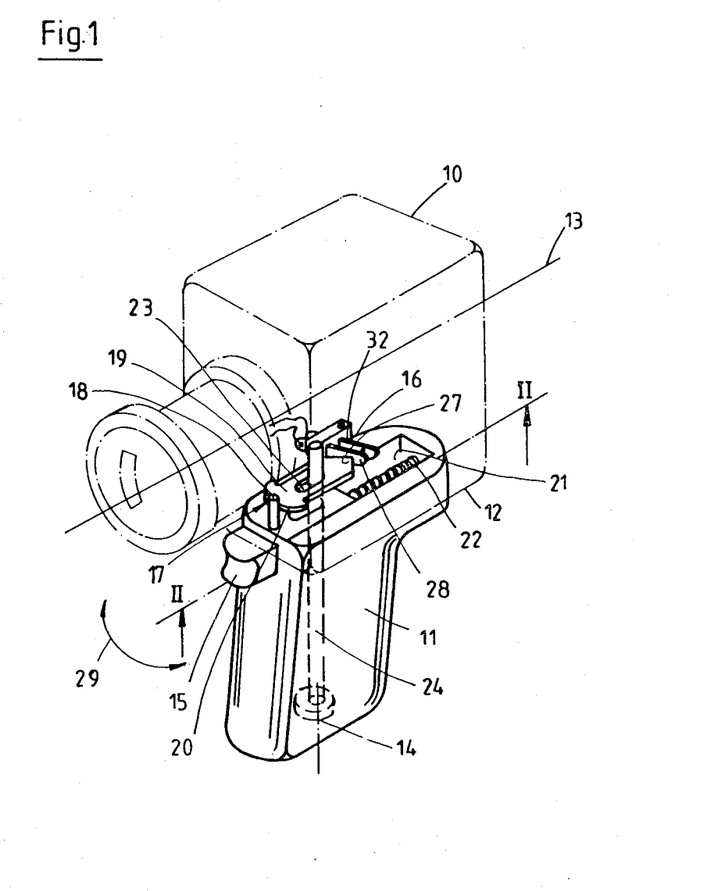
FIG. 1 is a perspective view of a camera according to a first embodiment of the invention.

In the embodiment of FIG. 1 the camera has a housing 10 and a handgrip 11 which is detachably mounted on the housing 10, and more particularly on the bottom wall 12 thereof. The handgrip 11 is tiltable about a pivot axis 14 which extends transverse to the optical axis 13 of the camera lens (illustrated but not provided with a reference numeral), and the pivot axis 14 extends substantially normal to the plane of the bottom wall 12 of the housing 10.

The handgrip 11 is provided with a manually operable trigger button 15 which is integrated as part of the handgrip, i.e. which cannot be detached from the same in normal use. Mounted in the housing 10 and actuatable by the button 15 is a shutter release element, here in form of a switch 16. Interposed between the button 15 and the switch 16 is a coupling 17 which is composed of two coupling members 18 and 19 that are movable relative to one another. One of the coupling members is a pin 18 and the other coupling member is a segment 19 having an arcuate engaging surface 20. The pin 18 and the segment 19 are so arranged that when the handgrip 11 is tilted about the pivot axis 14, the pin 18 and the surface 20 will slide in contact with one another and the pin 18 (which is connected with the button 15) and the segment 19 (which is connected with a contact of the switch 16) are so arranged that in all relative angular positions of handgrip 11 and housing 10 motion can be transmitted between them in order to operate the switch 16 and thereby the shutter release. The pin 18 is in this embodiment mounted in the handgrip 11 and the segment 19 in the housing 10.

The button 15 is mounted in the handgrip 11 so that it can slide lengthwise of the optical axis 13. For this purpose the handgrip 11 is provided with a groove extending lengthwise of the optical axis 13 and the button 15 (which is of substantially square cross-section) is slidably guided in the groove 21. A restoring spring 22 is interposed between the closed end of the groove 21 and the facing end of the button 15, bearing upon both of them and urging the button 15 to a normal inoperative position. The button 15 carries the pin 18 which thus follows the translatory movement of the button 15 lengthwise of the groove 21.

The segment 19 is also slidable lengthwise of the optical axis 13, but is arranged in the housing 10. It has a longitudinal slot 23 through which a bolt 24 extends which can be threaded into an appropriately tapped receiver of the housing 10. The bolt 24 extends lengthwise through the handgrip 11 and thus serves to detachably fasten the handgrip 11 to the housing 10. In addition, the bolt 24 defines the pivot axis 14 for turning of the handgrip 11 relative to the housing 10.

The segment 19 is guided for movement lengthwise of the optical axis 13 by two additional projections 25 and 26 in the housing 10, which slidably guide the opposite edges of the segment 19. The latter is provided at its forward end, as considered with reference to the direction of actuating movement, with a projection or nipple 27 in the path of displacement of which the movable contact of the switch 16 is arranged. The movable contact is springy and is identified with reference numeral 28, engaging the nipple 27 and serving to push the segment 19 to its inoperative (starting) position when the button 15 is released by the finger of a user. The segment 19 has an arcuately curved contact surface 20 which is convexly curved in the pivoting direction 29 of the handgrip 11, and pin 18 engages this surface 20 in each and every pivoted position of the handgrip 11 relative to the housing 10. A pair of abutments 30 and 31 (compare FIGS. 2 and 3) provided at the bottom wall 12 of the housing 10 define the outer limits of the respective pivoting movements permitted for the handgrip 11. In FIG. 1 the handgrip is shown in its center or basic position whereas in FIGS. 2 and 3 it is shown in its two possible extreme positions, and it will be noted by comparison of FIGS. 1–3 that in any of these possible positions the pin 18 is always in engagement with the surface 20.

When it is desired to operate the camera a user depresses the button 15 lengthwise of the optical axis 13 and inwardly of the handgrip 11, this causes the pin 18 to follow this movement and in turn to displace the segment 19 (via its engagement with the surface 20 thereof) in the direction of the optical axis 13, whereby the nipple 27 presses the contact 28 against a stationary contact 32 of the switch, closing the same and thus triggering the shutter. As soon as the button 15 is released, it is returned to its inoperative position by the spring 22, and in so doing it retracts the pin 18, which is closely followed by the segment 19 that is being urged to its own inoperative position by the spring effect of the springy contact 28. The surface 20 always remains in engagement with the pin 18.

Figure 4:
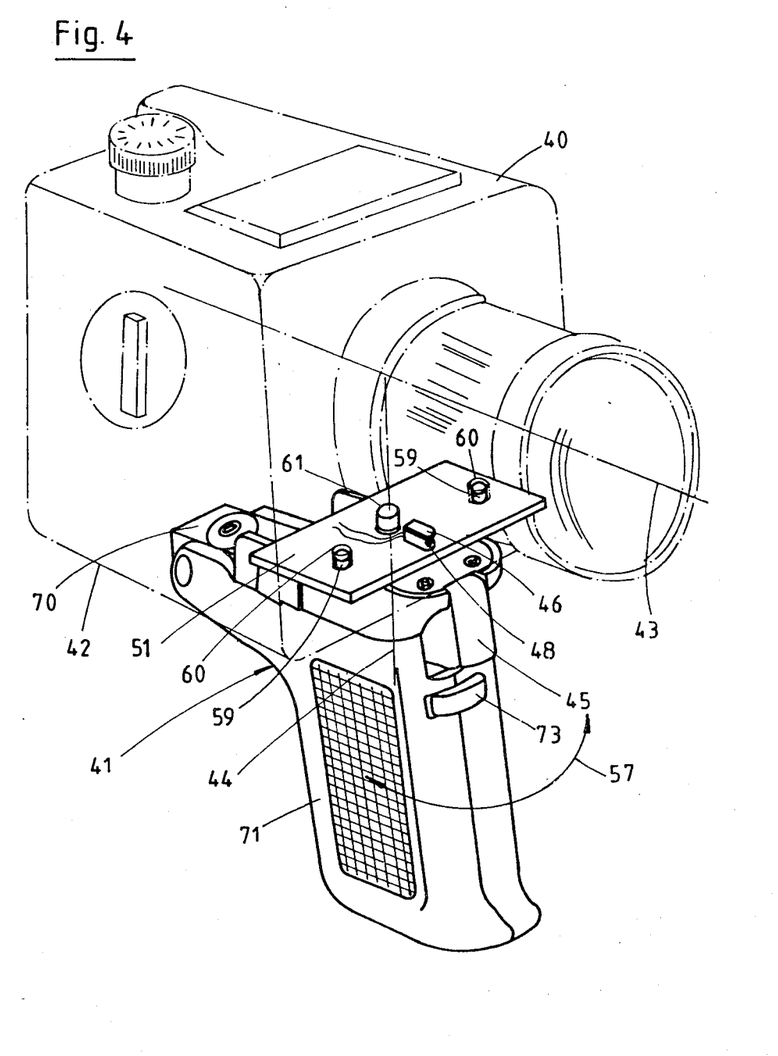
FIG. 4 is a perspective view of a camera according to a second embodiment of the invention.
Figure 5:
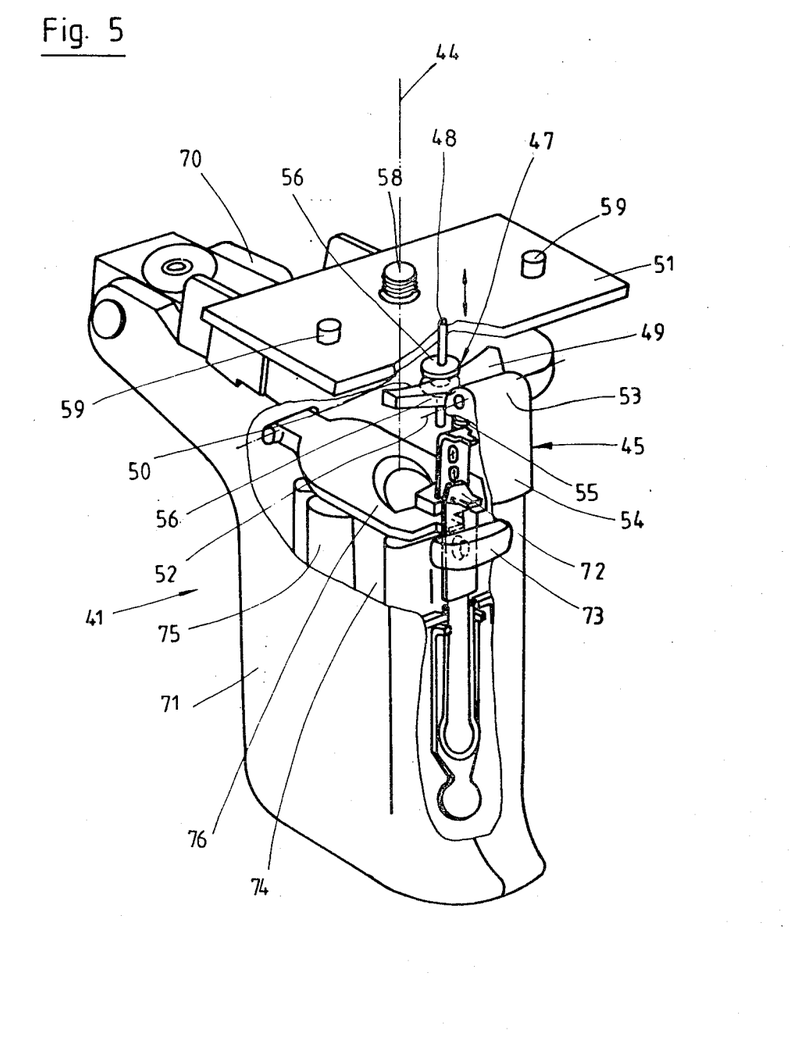
FIG. 5 is a perspective view, partly broken away, of the handgrip of the camera in FIG. 4.
Figure 6:
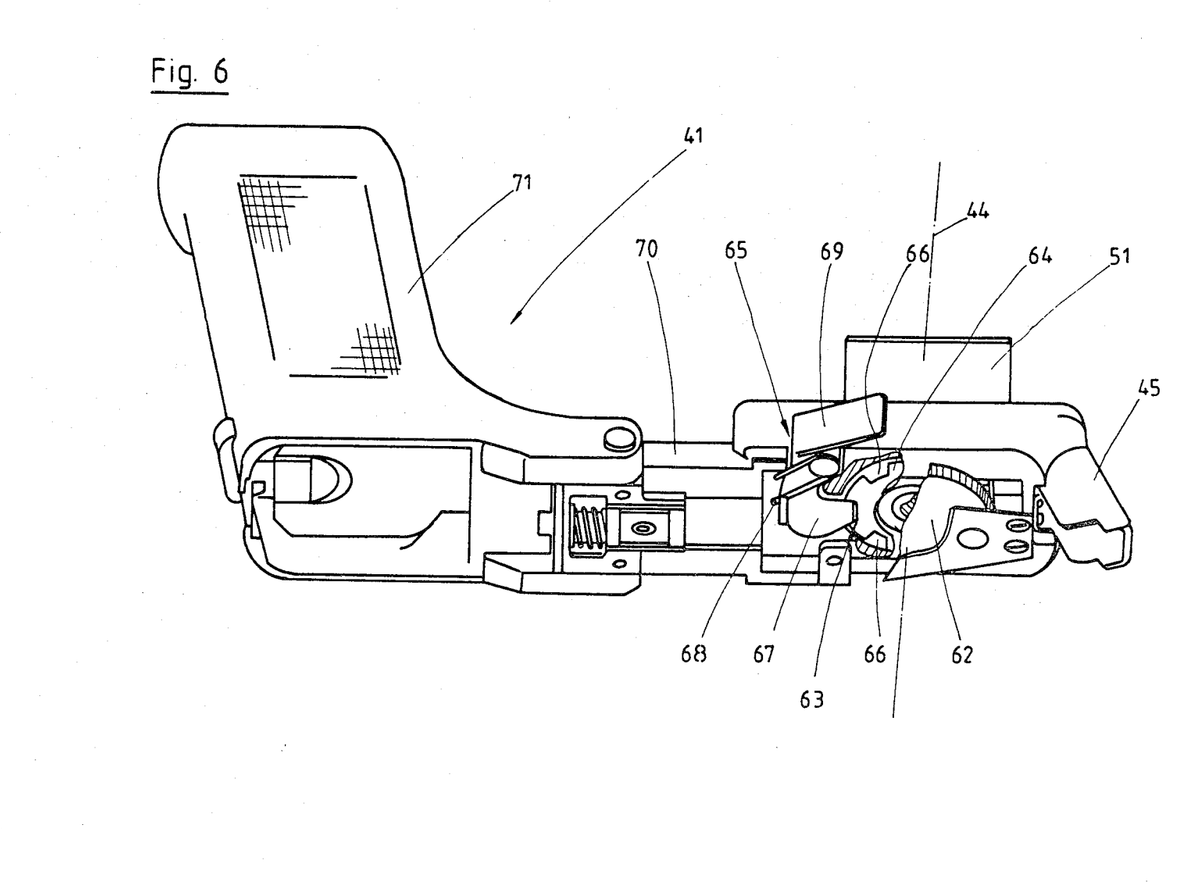
FIG. 6 is a perspective view of the handgrip of the camera in FIG. 4, with a part of the handgrip folded away with respect to the remainder of the handgrip.

A further embodiment of the invention is illustrated in FIGS. 4–6. Again, the illustration is made with reference to a still camera, but the invention is equally applicable to a motion picture camera.

In FIGS. 4–6 the camera housing is identified with reference numeral 40 and the detachably mounted handgrip with reference numeral 41. As before, the handgrip 41 is connectable to the bottom wall 42 of the housing 40 and is pivotable about a pivot axis 44 extending substantially transverse to the optical axis 43 and substantially normal to the surface or plane of the bottom wall 42 of the housing 40.

The trigger button 45 is mounted in the handgrip 41 and a switch 46 to be actuated by the button 45 is mounted in the camera housing 40. As before, the button 45 is an integrated component of the handgrip 41 and is non-detachably, i.e. in normal use, connected with the handgrip 41 so that it cannot be lost or inadvertently disconnected therefrom. A coupling 47 is provided, as before, between the button 45 and the switch 46 and is again composed of two relatively movable coupling members. One of these is the pin 48 and the other the segment 49 having an arcuately curved coupling surface 50. The pin 48 and the segment 49 are arranged in such a manner that when the handgrip 41 is turned about the pivot axis 44, the pin 48 and the coupling surface 50 slide on and relative to one another.

Figure 2:
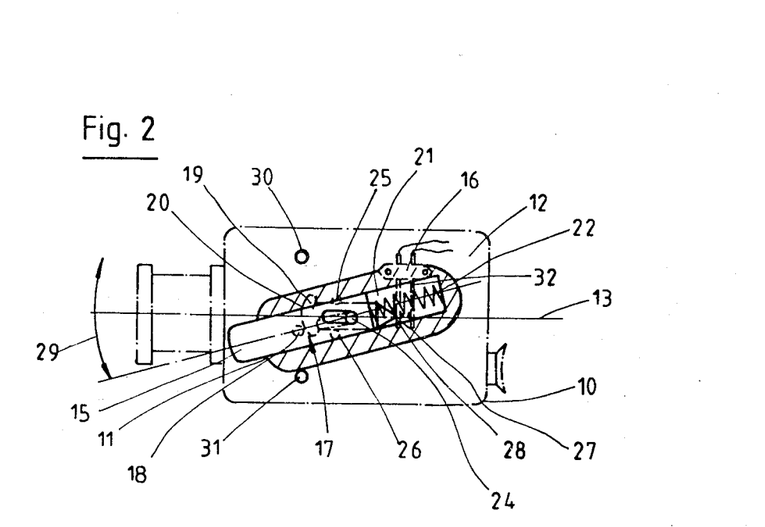
FIG. 2 is a section taken on line II—II of FIG. 1, showing the handgrip pivoted to one side out of its center position.
Figure 3:
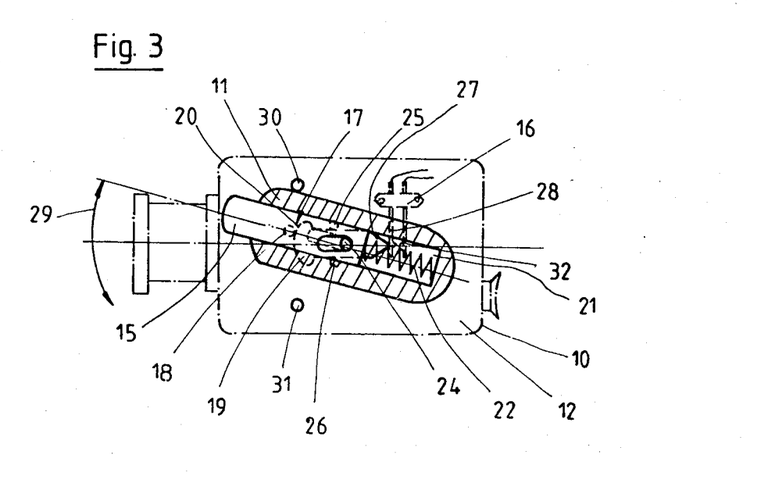
FIG. 3 is a view taken along the same section line II—II of FIG. 1, but showing the handgrip pivoted to the opposite side out of its center position.

Unlike the embodiment of FIGS. 1-3, however, the pin 48 and the segment 49 of the embodiment in FIGS. 4-6 are both arranged in the handgrip 41. The segment 49 is connected with the button 45 and the pin 48 is connected with the switch 46 in the housing 40. For this purpose a plate 51 is tiltably mounted in the handgrip 41 and the pin 48 is slidably guided on this plate 51 so that it can move essentially at right angles to the plate 51. The housing 40 is provided in its bottom wall 42 with an opening (not shown to avoid confusion) through which the pin 48 extends and can enter into the interior of the housing 40. The switch 46 is so arranged that its contacts are located in the path of movement of the pin 48, as is evident from FIG. 4.

FIG. 5 shows that the button 45 is tiltable about a pivot axis 52 extending transversely to the optical axis 43. Preferably, it is constructed as a tilt lever 53 having a surface 54 for engagement by the fingers of a user and being fixedly connected with the segment 49. When the lever 59 is engaged on its surface 54 and is tilted, its tilting movement is converted into a movement of the segment 49 which takes place essentially lengthwise of the pin 48. A restoring spring 55 engages the lever 53 or else the segment 49 and returns or permanently urges the button 45 and thus the segment 49 to inoperative rest position.

The pin 48 is, as mentioned before, slidable essentially at right angles to the plane of the plate 51 and thus of the bottom wall 42 of the housing 40. It is provided with two axially spaced fingers or projections which here are constructed as disks that are mounted on the pin 48 so that they cannot shift axially relative thereto, as shown in FIG. 5. An edge portion of the segment 49 is received in the space between these two fingers or disks 56. The engagement surface 46 of the segment 49 is concavely curved in the pivoting direction 57 (see FIG. 4) of the handgrip 41. That portion of the pin 48 which is located between the fingers or disks 56 is opposite the concave surface 50 and when the handgrip 41 is pivoted the surface 50 slides along and in contact with this part of the pin 48.

The handgrip 41 is detachably connectable to the bottom wall 42 of the housing 40 by means of a screw 58 projecting through the plate 51 and two pins or projections 59 extending upwardly from the plate 51. The two pins each extend into a respective depression 60 (FIG. 4) in the bottom wall 42 of the housing 40 (there could only be one projection and one depression, if desired) and the screw 50 can be threaded into a corresponding clap bore in the bottom wall 42, preferably in the threaded receiver for a tripod which is usually provided anyhow in such cameras. The knurled knob 62 serving to turn the screw 58 (FIG. 6) projects laterally of the handgrip 41 and can be operated manually by the fingers of a user. The screw 58 also defines the pivot axis 44 for the handgrip 41.

Unlike the camera in the preceding embodiment, the one in FIGS. 4-6 has an arrangement whereby the handgrip 41 can be arrested in, e.g. three defined tilted positions. For this purpose an arresting device 63 is provided having, as shown in FIG. 6, a disk 64 which is rigidly connected with the plate 51 and formed in its circumference with a number of recesses (here three) corresponding to the number of displaced positions permissible for the handgrip 41. These recesses 66 are engaged by a pawl 67 provided on a member 65 which is tiltably mounted on the handle 41. The pawl 67 is biased into a position entering into the respective recesses 66, by a spring 68. A surface 69 on the member 65 is engageable by the fingers of a user so that, when pressure is exerted upon the surface 69, the pawl 67 is retracted from the respective recesses 66 counter to the biasing of the spring 68.

A further difference between the embodiment in FIGS. 4-6 and the preceding embodiment is the fact that the handgrip 41 in FIGS. 4-6 is of two parts. It is composed of a supporting part 70 mountable on the bottom wall 42 of the housing, and an actual grip part 71 which can be folded relative to the supporting part 70. The button 45, the plate 51, the pin 48 and the segment 49 as well as the erecting device 63 are all arranged in the supporting part 70. When the grip part 71 is pivoted or folded to operative position with reference to the supporting part 70, a latch 72 (see FIG. 5) retains it in this operative position. A projection 73 serves to disengage the latch 72 so that the grip portion 71, which is hollow, can then be folded to the transporting position shown in FIG. 6. A compartment 47 may be provided in the grip portion 41 to store spare batteries, and may be closed by means of a cover 76. The latch 72 and the portion 73 may serve to lock and unlock the cover 76 as a secondary function.

To mount the handgrip 41 on the bottom wall 42 of the housing 40 of the camera, the handgrip 41 is placed in the folded-together position shown in FIGS. 4 and 5 against the bottom wall 42 so that the two pins 59 extend into the depressions 60 of the bottom wall 42. Thereafter, the knob 62 is turned until the screw 58 is properly threaded into the tapped bore 61 of the housing 40, and during this connecting operation the pin 48 extends through the opening in the bottom wall 42 and has its end located immediately adjacent the movable contact 46 of the shutter release switch. If the button 45 is now depressed, by the user placing a finger upon the surface 45 and depressing the button 45 in direction inwardly of the handgrip 41, the button 45 tilts and the segment 59 tilts upwardly counter to the force of the spring 55. The fingers or disks 56 raise the pin 48 up and cause the movable contact of the switch to engage the stationary contact, closing the circuit and triggering the operation of the camera. After the button 45 is released the segment 49 and the button 45 are returned by the restoring spring 55 into the rest position shown in FIGS. 4 and 5 and the fingers or disks 59 withdraw the pin 48 from the movable contact, allowing this to in turn back away from the stationary contact because the movable contact is of a springy type.

The handgrip 41 is illustrated in FIGS. 4-6 in its center position in which the pawl 46 engages the center one of the three recesses 66 of the disk 64. If it is desired for the handgrip 41 to be moved from the center position to one of its two opposite tilted end positions, then a user need merely press upon the surface 69, thereby causing the pawl 67 to be retracted from the center recess 66 counter to the urging of the spring 68, and the handgrip 41 can then be tilted relative to the camera housing 40 to the desired position, whereupon the surface 69 is released to permit the spring to move the pawl 67 into the respectively registering recess 66 to arrest the handgrip 41 in the newly selected position.

During tilting of the handgrip 41 the surface 50 slides along that portion of the pin 48 which is located between the two fingers or disks 56, and due to the construction of the segment 49 the projections or fingers 56 will always be in engagement with the segment 49, even in the extreme end positions of the handgrip 41, so that irrespective of the position of the handgrip 41 relative to the housing 4 the arrangement is always ready to close the switch 46 and trigger the shutter release.

It will be appreciated that only two exemplary embodiments have been shown and described herein in order to facilitate an understanding of the invention. This does not mean that the invention is limited to these embodiments. For example, the shape and dimensions of the handgrip can be quite different from what has been illustrated, and the handgrip can certainly also be mounted on one of the lateral or even the top surface of the camera housing, rather than only on the bottom wall thereof. The respective coupling 17 or 47 may still be constructed as described above, or various modifications may be made in them without departing from the spirit and concept of the present invention. In this connection it is also again emphasized that the invention is by no means limited to a still camera, but can be equally well used in a motion-picture camera.

While the invention has been illustrated and described as embodied in a still camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention.

What is claimed as new and desired to be protected by Letters Patent is set forth in the appended claims.

1. A camera, particularly a still camera, comprising a housing mounting a lens having an optical axis; a shutter release element in said housing; a handgrip on said housing and being at least in part turnable about a pivot axis extending transverse to said optical axis; a trigger element integrated in said handgrip; and coupling means connecting said trigger element with said shutter release element and operative for actuating said shutter release element in response to operation of said trigger element, said coupling means comprising a first coupling member connected to one of said elements and having an arcuate engaging surface, and a second coupling member connected to the other of said elements and in sliding contact with said engaging surface, so that motion-transmitting engagement between said members is maintained despite turning of said handgrip about said pivot axis.

2. A camera as defined in claim 1, wherein said first coupling member is a segment-shaped member and said second coupling member is a pin.

3. A camera as defined in claim 1, wherein said trigger element is a button.

4. A camera as defined in claim 1, said housing having a bottom wall, and said handgrip being mounted on said bottom wall with said pivot axis extending substantially normal to the bottom wall.

5. A camera as defined in claim 1, wherein said first coupling member is a segment-shaped member mounted in said housing, and said second coupling member is a pin mounted in said handgrip.

6. A camera as defined in claim 1, said trigger element being a button which is movable lengthwise of said optical axis and said second coupling member being a pin on said button movable with the same, and wherein said first coupling member is a segment-shaped member also slidable lengthwise of said optical axis and provided with a projection for operating said shutter release element in response to such sliding.

7. A camera as defined in claim 6, said engaging surface being convexly curved and said pin being located opposite a portion of said surface in all positions of said handgrip relative to said housing.

8. A camera as defined in claim 6, wherein said shutter release element comprises an electrical switch.

9. A camera as defined in claim 8, said electrical switch comprising a stationary contact, and a springy movable contact engaging said projection; and further comprising biasing means permanently biasing said button to a rest position in which said movable contact is out of engagement with said stationary contact.

10. A camera as defined in claim 1, said first coupling member being a segment-shaped member and said second coupling member being a pin; further comprising a plate in said handgrip and mounted on said housing, said pin being slidably mounted on said plate and said housing having an opening through which said pin can enter to engage said shutter release element; and wherein said segment-shaped member is coupled with said trigger element and slides said pin in response to operation of said trigger element.

11. A camera as defined in claim 10, said trigger element being tiltable about a tilt axis extending transverse to said optical axis, and said segment-shaped member being so coupled with said trigger element that tilting movement of the trigger element about said tilt axis effects movement of said segment-shaped member in a sense causing it to slide said pin.

12. A camera as defined in claim 11, said trigger element being a tilt lever rigid with said segment-shaped member and having a finger-engaging face exposed outside said handgrip.

13. A camera as defined in claim 12; and further comprising biasing means permanently biasing said tilt lever to an inoperative rest position.

14. A camera as defined in claim 10, said pin having two portions spaced from one another longitudinally of the pin and receiving between them an edge portion of said segment-shaped member which is provided with said arcuate surface.

15. A camera as defined in claim 14, said portions being disks fixedly mounted on said pin against displacement axially of the same.

16. A camera as defined in claim 10, said plate having a screw mounted thereon for turnable displacement relative to the plate and projecting in part beyond the plate, and further comprising a protrusion also projecting from said plate; and wherein said housing is provided with a tapped bore for said screw and with a recess for said protrusion, so that the handgrip can be mounted on and dismounted from said housing and pivot relative to said plate and said housing.

17. A camera as defined in claim 16; and further comprising means for arresting said plate and handgrip relative to one another in at least three different pivoted relative positions.

18. A camera as defined in claim 17, said arresting means comprising a disk rigid with said plate and provided with at least three detents each corresponding to one of said positions.

19. A camera as defined in claim 18, said disk having a periphery and said detents being recesses in said periphery; said arresting means further comprising a pawl on said handgrip and engageable in said recesses, a spring urging said pawl to recess-engaging position, and a finger-engaging surface on said pawl for retraction of the pawl from the respective recess.

20. A camera as defined in claim 18, said handgrip having a first part mounted on said housing and a second part foldable relative to said first part to and from an extended operating position, said trigger element, plate, pin, segment-shaped member and arresting means being arranged in said first part.

* * * * *